United States Patent
Choi et al.

(10) Patent No.: US 12,411,207 B2
(45) Date of Patent: Sep. 9, 2025

(54) METHOD AND APPARATUS WITH RADAR SIGNAL PROCESSING

(71) Applicant: Samsung Electronics Co., Ltd., Suwon-si (KR)

(72) Inventors: Sungdo Choi, Suwon-si (KR); Young Rae Cho, Suwon-si (KR); Hyunwoong Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 464 days.

(21) Appl. No.: 17/940,334

(22) Filed: Sep. 8, 2022

(65) Prior Publication Data

US 2023/0213614 A1 Jul. 6, 2023

(30) Foreign Application Priority Data

Dec. 30, 2021 (KR) ........................ 10-2021-0192883

(51) Int. Cl.
*G01S 7/35* (2006.01)
*G01S 7/41* (2006.01)
(Continued)

(52) U.S. Cl.
CPC .............. *G01S 7/354* (2013.01); *G01S 7/356* (2021.05); *G01S 7/415* (2013.01); *G01S 13/584* (2013.01); *G01S 13/931* (2013.01)

(58) Field of Classification Search
None
See application file for complete search history.

(56) References Cited

U.S. PATENT DOCUMENTS 6,828,929 B2  12/2004  Barbella et al.
9,739,879 B2   8/2017  Rohling
(Continued)

FOREIGN PATENT DOCUMENTS

JP        2868978 B2      3/1999
KR   10-2019-0025997 A    3/2019
(Continued)

OTHER PUBLICATIONS

Extended European search report issued on May 19, 2023, in counterpart European Patent Application No. 22205365.4 (66 pages in English).

(Continued)

*Primary Examiner* — Marcus E Windrich
(74) *Attorney, Agent, or Firm* — NSIP Law

(57) ABSTRACT

A method and apparatus with radar signal processing are included. A method includes transmitting, through transmission antenna elements, a radar signal at a transmission time interval corresponding to a time division multiplexing (TDM) latency, receiving a reflected signal of the radar signal through reception antenna elements, determining directions of arrival (DOAs) respectively corresponding to the transmission antenna elements by classifying radar data corresponding to the reflected signal, wherein the classifying is based on the transmission time interval, determining an unambiguous element of a phase error element by applying an ambiguous Doppler velocity that is based on the radar data to the phase error element of the individual DOA data, and determining integrated DOA data corresponding to the transmission antenna elements by integrating the individual DOA data by suppressing an ambiguous element of the phase error element.

31 Claims, 12 Drawing Sheets

+   =

Transmission antenna elements 601   Reception antenna elements 602   Virtual array antenna 603

(51) Int. Cl.
 *G01S 13/58* (2006.01)
 *G01S 13/931* (2020.01)

(56) References Cited

U.S. PATENT DOCUMENTS

| | | | |
|---|---|---|---|
| 2018/0011170 A1* | 1/2018 | Rao | G01S 7/354 |
| 2021/0026003 A1* | 1/2021 | Panzer | G01S 13/931 |
| 2021/0270933 A1* | 9/2021 | Hakobyan | G01S 7/354 |
| 2021/0293949 A1 | 9/2021 | Breddermann et al. | |
| 2021/0333386 A1* | 10/2021 | Park | G01S 7/356 |
| 2022/0236409 A1* | 7/2022 | Solodky | G01S 13/931 |

FOREIGN PATENT DOCUMENTS

| | | |
|---|---|---|
| KR | 10-2143948 B1 | 8/2020 |
| KR | 10-2021-0058303 A | 5/2021 |
| KR | 10-2021-0101957 A | 8/2021 |
| KR | 10-2022-0066796 A | 5/2022 |

OTHER PUBLICATIONS

Hu, Xueyao, et al. "A multi-carrier-frequency random-transmission chirp sequence for TDM MIMO automotive radar." *IEEE Transactions on Vehicular Technology* vol. 68. Issue 4 (2019). pp 1-14.

\* cited by examiner

US 12,411,207 B2

METHOD AND APPARATUS WITH RADAR SIGNAL PROCESSING

CROSS-REFERENCE TO RELATED APPLICATIONS

This application claims the benefit under 35 USC § 119(a) of Korean Patent Application No. 10-2021-0192883, filed on Dec. 30, 2021, in the Korean Intellectual Property Office, the entire disclosure of which is incorporated herein by reference for all purposes.

BACKGROUND

1. Field

The following description relates to a method and apparatus with radar signal processing.

2. Description of Related Art

Advanced driver-assistance systems (ADASs) may support driving to improve a driver's safety and convenience and avoid dangerous situations by using sensors mounted inside or outside vehicles.

Herein, sensors used in an ADAS may include radar(s) and camera(s) and infrared sensor(s), ultrasonic sensor(s), and/or LiDAR(s). Among those sensors, a radar is capable of stably measuring objects in the vicinity of a vehicle without being affected by a surrounding environment, such as the weather, when compared to optical-based sensors.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method includes transmitting, through transmission antenna elements of a radar sensor, a radar signal at a transmission time interval corresponding to a time division multiplexing (TDM) latency, wherein the radar signal is for a TDM-based multiple-input multiple-output (MIMO) radar system including the radar sensor, receiving a reflected signal of the radar signal through reception antenna elements of the radar sensor, determining directions of arrival (DOAs) respectively corresponding to the transmission antenna elements by classifying radar data corresponding to the reflected signal, wherein the classifying is based on the transmission time interval, determining an unambiguous element of a phase error element by applying an ambiguous Doppler velocity that is based on the radar data to the phase error element of the individual DOA data, and determining integrated DOA data corresponding to the transmission antenna elements by integrating the individual DOA data by suppressing an ambiguous element of the phase error element.

The determining of the integrated DOA data may include integrating the individual DOA data based on an absolute value of the ambiguous element of the phase error element.

The transmission antenna elements may transmit the radar signal in an activation order, which may be different from a physical order of the transmission antenna elements.

The transmission antenna elements may be classified into a transmission group of which sums of order values based on the activation order may be the same, and the determining of the integrated DOA data further may include determining intermediate data by integrating the individual DOA data by the transmission group, and the method further may further include determining the integrated DOA data by integrating the intermediate data.

The integrated DOA data may include an offset corresponding to the sums of the order values.

The ambiguous Doppler velocity may be determined by performing a two-dimensional (2D) Fourier transform based on the radar data.

The 2D Fourier transform may include a Fourier transform based on a range and a Fourier transform based on a Doppler frequency.

The unambiguous element and the ambiguous element of the phase error element may be discriminated from one another based on a relationship between the ambiguous Doppler velocity, an unambiguous Doppler velocity, a Doppler ambiguity number, and a maximum range of a measurable Doppler velocity.

The unambiguous element of the phase error element may be independent from the Doppler ambiguity number, and the ambiguous element of the phase error element may be dependent on the Doppler ambiguity number.

An ambiguity of the ambiguous Doppler velocity may be induced by an aliasing effect.

The unambiguous element of the phase error element may be motion-induced.

The suppressing the ambiguous element of the phase error element may be based on the unambiguous element of the phase error.

In one general aspect, a system includes a processor configured to transmit a radar signal for a TDM-based MIMO radar system at a transmission time interval based on a TDM latency through one or more transmission antenna elements of a radar sensor, receive a reflected signal of the radar signal through reception antenna elements of the radar sensor, determine individual DOA data corresponding to the transmission antenna elements by classifying, according to the transmission antenna elements, radar data corresponding to the reflected signal based on the transmission time interval, determine an unambiguous element of a phase error element by applying an ambiguous Doppler velocity that is based on the radar data to the phase error element of the individual DOA data, and determine integrated DOA data corresponding to the transmission antenna elements by integrating the individual DOA data by suppressing an ambiguous element of the phase error element.

The processor may be further may be configured to integrate the individual DOA data based on an absolute value of the ambiguous element of the phase error element.

The transmission antenna elements transmit the radar signal in an activation order, which may be different from a physical order of the transmission antenna elements in the radar sensor.

The transmission antenna elements may be classified into a transmission group of which a sum of order values based on the activation order may be same, and wherein the processor may be further may be configured to determine intermediate data by integrating the individual DOA data by the transmission group, and determine the integrated DOA data by integrating the intermediate data.

The unambiguous element and the ambiguous element of the phase error element may be discriminated from one another based on a relationship between the ambiguous Doppler velocity, an unambiguous Doppler velocity, a Doppler ambiguity number, and a maximum range of a measurable Doppler velocity.

The unambiguous element of the phase error element may be independent from the Doppler ambiguity number, and the ambiguous element of the phase error element may be dependent on the Doppler ambiguity number.

The unambiguous element of the phase error element may be motion-induced.

The system may be an electronic device that further may include the radar sensor.

The electronic device may be a vehicle, and wherein the integrated DOA data may be for controlling the vehicle.

The unambiguous element of the phase error element may be motion-induced.

In one general aspect, a vehicle includes a radar sensor having an array antenna, the radar sensor is configured to implement TDM-based MIMO using transmission antenna elements and reception antenna elements, a processor is configured to control transmission, through the transmission antenna elements, of a radar signal, wherein the radar signal is transmitted at a transmission time interval based on a TDM latency, determine individual DOA data corresponding to the transmission antenna elements by classifying, according to the transmission antenna elements, radar data corresponding to a reflected signal of the transmitted radar signal received through the reception antenna elements, wherein the individual DOA is determined based on the transmission time interval, determine an unambiguous element of a phase error element by applying an ambiguous Doppler velocity that is based on the radar data to the phase error element of the individual DOA data, and determine integrated DOA data corresponding to the transmission antenna elements by integrating the individual DOA data by suppressing an ambiguous element of the phase error element, and a control system is configured to control the vehicle based on the integrated DOA data.

The processor may be configured to integrate the individual DOA data based on an absolute value of the ambiguous element of the phase error element.

The transmission antenna elements may transmit the radar signal in an activation order, which may be different from a disposition order in the radar sensor, the transmission antenna elements may be classified into transmission groups of which sums of order values based on the activation order may be the same, and the processor may be configured to determine intermediate data by integrating the individual DOA data by the transmission groups, and determine the integrated DOA data by integrating the intermediate data.

The unambiguous element of the phase error element may include a motion-induced unambiguous element of the phase error element.

In one general aspect, a method includes transmitting a signal through a transmission antenna, wherein the signal has a transmission time interval corresponding to a TDM latency, receiving, by reception antennas, a reflected signal of the transmitted signal, determining directions of arrival (DOAs) respectively corresponding to the transmission antenna elements based on the transmission time interval, determining an unambiguous component of a phase error based on the reflected signal by applying an ambiguous Doppler velocity to the phase error of the DOAs, and based on the determining of the unambiguous component of the phase error, determining an integrated DOA by integrating the individual DOAs by suppressing an ambiguous component of the phase error component.

The signal may be for a TDM-based multiple-input MIMO radar system that may further include the radar sensor, the transmission antenna, and the reception antennas.

The individual DOAs may be determined by classifying radar data components of the reflected signal respectively received through the reception antennas.

The classifying may include executing a constant false alarm rate algorithm.

A non-transitory computer-readable storage medium may store instructions that, when executed by a processor, cause the processor to perform any of the methods.

Other features and aspects will be apparent from the following detailed description, the drawings, and the claims.

Figure 1:
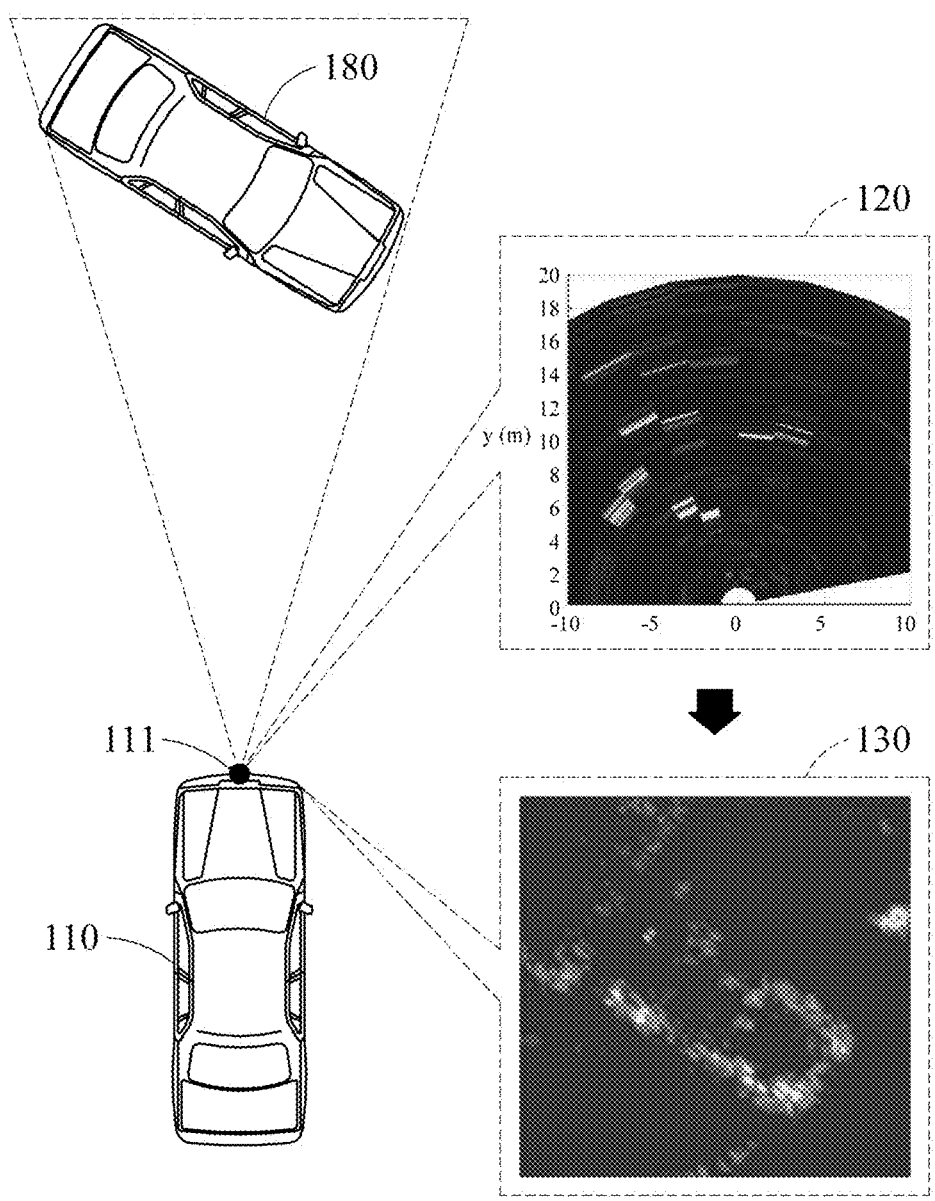
FIG. 1 illustrates an example of recognizing a surrounding environment by a radar signal processing method, according to one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

FIG. 1 illustrates an example of recognizing a surrounding environment by a radar signal processing method, according to one or more embodiments. Referring to FIG. 1, a radar signal processing apparatus 110 may detect information on a target 180 ahead (for example, a range, a velocity, a direction, and the like) by analyzing a radar signal received by a radar sensor 111. The radar sensor 111 may be inside or outside the radar signal processing apparatus 110, and the radar signal processing apparatus 110 may detect the information on the target 180 ahead, based on both the radar signal received by the radar sensor 111 and data collected by another sensor (for example, an image sensor, etc.). Resolving power in radar data processing is generally classified into resolving power performance in terms of hardware and resolving power performance in terms of software (e.g., in the form of instructions, code, etc. that configures a processor to perform the radar signal processing). Hereinafter, improvement of the resolving power performance in terms of software will be mainly described. However, the described techniques can be readily implemented in functionally equivalent hardware.

In an example, the resolving power refers to power of a device to discriminate a very small change, for example, smallest unit discriminative power, and it may be expressed as "resolving power=(discriminable smallest scale unit)/(total operation range)". The smaller the resolving power value of the device, the more precise the results the device may output. The resolving power value may also be referred to as a resolving power unit. For example, if the device has a small resolving power value, the device may discriminate a relatively small unit, and thus, the device may output results with increased resolution and improved precision. If the device has a large resolving power value, the device may not discriminate a small unit, and thus, output results with reduced resolution and reduced precision.

The radar signal processing apparatus 110 may be mounted in a vehicle, as shown in FIG. 1. The vehicle may perform, for example, adaptive cruise control (ACC), automatic emergency braking (AEB), blind spot detection (BSD), lane change assistance (LCA), and/or other similar operations based on the range to the target 180 detected by the radar signal processing apparatus 110. Furthermore, the radar signal processing apparatus 110 may generate a surrounding map 130, in addition to detecting the range. The surrounding map 130 represents positions of various targets present around the radar signal processing apparatus 110, such as the target 180. A surrounding target may be a dynamic object, such as a vehicle and a human, and may be a static object that is present in a background, such as a guard rail and a traffic light.

As a method of generating the surrounding map 130, a single scan image method may be used. In the single scan image method, the radar signal processing apparatus 110 acquires a single scan image 120 from a sensor and generates the surrounding map 130 from the single scan image 120. The single scan image 120 may be generated from a radar signal generated by a single radar sensor 111 and may represent ranges that are indicated by radar signals received from an arbitrary elevation angle at relatively high resolving power. For example, in the single scan image 120 of FIG. 1, the horizontal axis denotes a steering angle of the radar sensor 111 and the vertical axis denotes a range from the radar sensor 111 to the target 180. However, a form of the single scan image 120 is not limited to the example illustrated in FIG. 1, and may be represented in a different format based on a design.

The steering angle may represent an angle corresponding to a target direction from the radar signal processing apparatus 110 to the target 180. For example, the steering angle may represent an angle between a heading direction of the radar signal processing apparatus 110 (or a radar processing device) and a target direction. For reference, although the steering angle herein is mainly described as an azimuth angle, this is an example only. For example, the steering angle may apply to an elevation angle.

According to an example embodiment, the radar signal processing apparatus 110 may acquire information about the shape of the target 180 from a multi-radar map. The multi-radar map may be generated from a combination of radar scan images. For example, the radar signal processing apparatus 110 may generate the surrounding map 130 by spatial-temporally combining radar scan images acquired according to a movement of the radar sensor 111. The surrounding map 130 may be a kind of a radar image map and may be used for auto-pilot parking, for example.

According to an example embodiment, the radar signal processing apparatus 110 may use direction of arrival (DOA) information to generate the surrounding map 130. The DOA information refers to information indicating a direction in which a radar signal reflected from the target 180 is received. The radar signal processing apparatus 110 may identify a direction in which the target 180 is present, based on the radar sensor 111 using the DOA information. Therefore, the DOA information may be used to generate radar scan data and the surrounding map 130.

According to an example embodiment, radar information, such as a range, a velocity, a DOA, and/or map information about the target 180, generated by the radar signal processing apparatus 110, may be used to control a vehicle to which the radar signal processing apparatus 110 is mounted or incorporated. For example, such control of the vehicle may include velocity and steering control of the vehicle, such as ACC, AEB, BSD, and LCA. A control system of the vehicle may control the vehicle by directly or indirectly using the radar information. For example, when a velocity of a target is measured according to Doppler effect, the control system may accelerate the vehicle to follow a corresponding target or may brake the vehicle to prevent colliding with the corresponding target.

Figure 2:
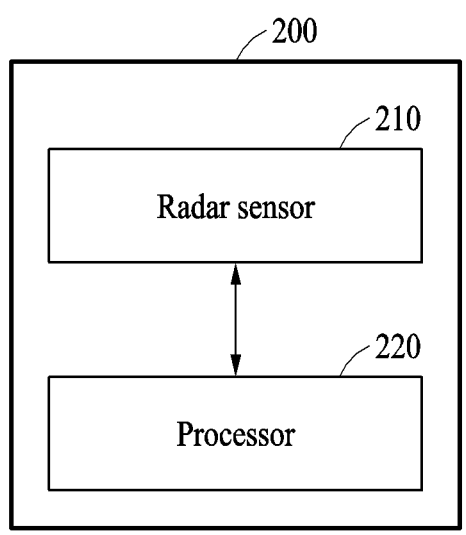
FIG. 2 illustrates an example of a configuration of a radar signal processing apparatus, according to one or more embodiments.

FIG. 2 illustrates an example of a configuration of a radar signal processing apparatus. Referring to FIG. 2, a radar signal processing apparatus 200 may include a radar sensor 210 and a processor 220. The radar sensor 210 may radiate a radar signal to outside the radar sensor 210 (i.e., emit electromagnetic radiation), and may receive a signal which is a reflection of the radiated radar signal, reflected by a target exterior or environment for example. Here, the radiated radar signal is referred to as a radar transmission signal, and the received signal is referred to as a radar reception signal. The radar transmission signal may include a chirp signal of which a carrier frequency is modulated based on a frequency modulation model. A frequency of the radar transmission signal may continuously vary within a predetermined band. For example, the frequency of the radar transmission signal may linearly vary within the predetermined band.

The radar sensor 210 may include an array antenna, and through the array antenna, the radar sensor 210 may continuously (or intermittently) transmit such radar transmission signals and continuously (or intermittently) receive such radar reception signals. The array antenna may include a plurality of antenna elements. Multiple-input multiple-output (MIMO) may be implemented through the plurality of antenna elements. Here, a plurality of MIMO channels may be formed by the plurality of antenna elements. For example, a plurality of channels respectively corresponding to M×N virtual antennas may be formed through M transmission antenna elements and N reception antenna elements. Here, radar reception signals received through the respective channels may have different phases, based on reception directions.

Radar data may be generated based on the radar transmission signal and the radar reception signal. For example, the radar sensor 210 may transmit the radar transmission signal through the array antenna, based on the frequency modulation model, may receive the radar reception signal through the array antenna when the radar transmission signal is reflected by the target, and may generate an intermediate frequency (IF) signal based on the radar transmission signal and the radar reception signal. The IF signal may have a frequency corresponding to a difference between the frequency of the radar transmission signal and the frequency of the radar reception signal. The IF may be referred to as a beat frequency. The processor 220 may perform a sampling operation on the IF signal and may generate radar raw data through sampling results. The radar data may correspond to IF raw data.

The processor 220 may generate and use information on the target and/or environment, based on the radar data. For example, the processor 220 may perform a range-fast Fourier transform (FFT), a Doppler FFT, constant false alarm rate (CFAR) detection, and DOA estimation, and may obtain the information on the target, such as a range, a velocity, and a direction. The information on the target may be provided for various applications, such as ACC, AEB, BSD, and LCA.

Figure 3:
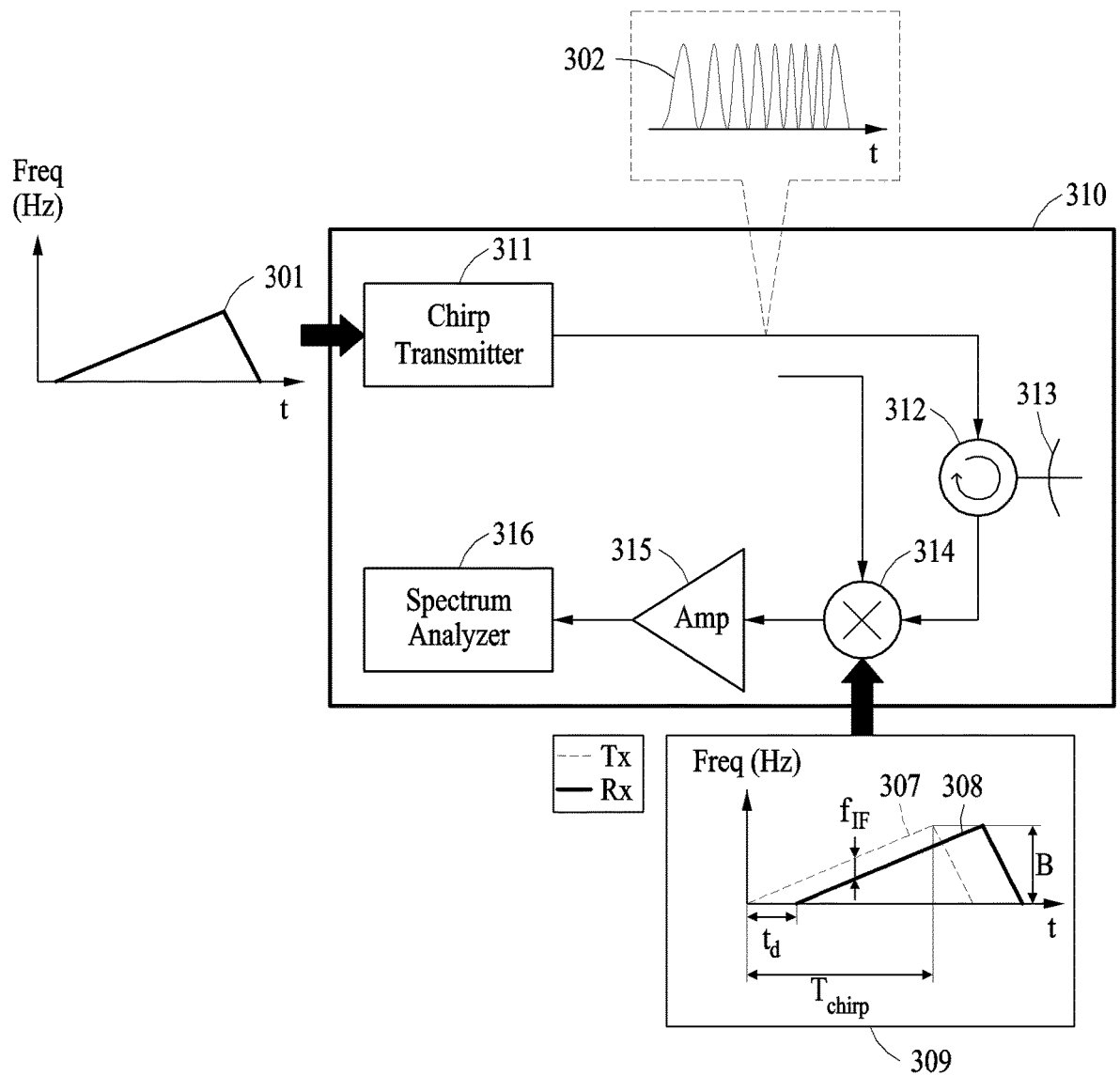
FIG. 3 illustrates an example of a configuration of a radar sensor, according to one or more embodiments.

FIG. 3 illustrates an example of a configuration of a radar sensor. Referring to FIG. 3, a radar sensor 310 may include a chirp transmitter 311, a duplexer 312, an antenna 313, a frequency mixer 314, an amplifier 315, and a spectrum analyzer 316. The spectrum analyzer 316 may correspond to the processor 220 of FIG. 2. In this case, the spectrum analyzer 316 may be placed outside the radar sensor 310, like the processor 220. The radar sensor 310 may radiate a signal through the antenna 313 and may receive a signal through the antenna 313. Although FIG. 3 illustrates a single antenna 313, the antenna 313 may include at least one transmission antenna and at least one reception antenna. For example, the antenna 313 may correspond to an array antenna. For example, the antenna 313 may include three or more reception antenna elements. In this case, the reception antenna elements may be spaced apart at equal intervals.

The radar sensor 310 may be, for example, an mmWave radar and may measure a range to a target by analyzing a change in a waveform of a radar signal and a time of flight (ToF), which is a time until a radiated electric wave returns after being reflected by the target. For reference, compared to an optic-based sensor including a camera, the mmWave radar may detect front regardless of a change in an external environment, such as fog and rain. In addition, since the mmWave radar has excellent cost performance compared to LiDAR, the mmWave radar may be one of the sensors that may compensate for the aforementioned disadvantages of the camera. For example, the radar sensor 310 may be implemented as a frequency modulated continuous wave (FMCW) radar. The FMCW radar may be robust against external noise.

The chirp transmitter 311 may generate a frequency modulated (FM) signal 302 of which a frequency varies over time. For example, the chirp transmitter 311 may generate the FM signal 302 by performing frequency modulation based on a frequency modulation characteristic of a frequency modulation model 301. The FM signal 302 may be referred to as a chirp signal. Herein, the frequency modulation model 301 may be a model configured to indicate a change in a carrier frequency of a radar transmission signal during a provided transmission time. The vertical axis of the frequency modulation model 301 may represent the carrier frequency, and the horizontal axis may represent time. For example, the frequency modulation model 301 may have a frequency modulation characteristic of linearly changing (for example, linearly increasing or linearly decreasing) the carrier frequency. As another example, the frequency modulation model 301 may have a frequency modulation characteristic of the carrier frequency non-linearly changing.

The frequency modulation model 301 of FIG. 3 may have a frequency modulation characteristic of the frequency linearly increasing over time. The chirp transmitter 311 may generate the FM signal 302 having a carrier frequency based on the frequency modulation model 301. For example, as shown in FIG. 3, the FM signal 302 may represent a waveform in which the carrier frequency gradually increases in some sections and a waveform in which the carrier frequency gradually decreases in the remaining sections.

The chirp transmitter 311 may transmit the FM signal 302 to the duplexer 312. The duplexer 312 may determine a transmission path and a reception path for signals through the antenna 313. For example, while the radar sensor 310 radiates the FM signal 302, the duplexer 312 may form a signal path from the chirp transmitter 311 to the antenna 313, may transmit the FM signal 302 to the antenna 313 via the formed signal path, which may then radiate the FM signal 302 to the outside. While the radar sensor 310 receives the signal reflected from the target, the duplexer 312 may form a signal path from the antenna 313 to the spectrum analyzer 316. The antenna 313 may receive a reception signal, which is a signal that has been radiated and returned by reflection from an obstacle or target. The radar sensor 310 may transmit the reception signal to the spectrum analyzer 316 through the signal path from the antenna 313 to the spectrum analyzer 316. The signal radiated through the antenna 313 may be referred to as a radar transmission signal, and the signal received through the antenna 313 may be referred to as a radar reception signal.

The frequency mixer 314 may compare a frequency 308 of the radar reception signal, which is reflected from the target and received, to a frequency 307 of the radar transmission signal. For reference, the frequency 307 may vary depending on a change in frequency relative to a carrier frequency (frequency of the transmitted signal) indicated by the frequency modulation model 301. The frequency mixer 314 may detect an IF $f_{IF}$ corresponding to a frequency difference between the frequency 308 of the radar reception signal and the frequency 307 of the radar transmission signal. In graph 309 shown in FIG. 3, the frequency difference between the radar transmission signal and the radar reception signal may be constant in a section in which the carrier frequency linearly increases along a time axis in the frequency modulation model 301, and may be proportional to a range between the radar sensor 310 and the target ("object" and "target" are used interchangeably herein). Accordingly, the range between the radar sensor 310 and the target may be derived from the frequency difference between the radar transmission signal and the radar reception signal.

A beat frequency signal detected through the frequency mixer 314 may be transmitted to the spectrum analyzer 316 via the amplifier 315. The beat frequency signal may be represented by Equation 1 shown below.

$$y(t) = \frac{\alpha}{2}\cos\left(\varphi_0 - 2\pi f_c t_d + \pi\frac{B}{T_c}t_d^2 - 2\pi\frac{B}{T_c}t_d t\right) \quad \text{Equation 1}$$

In Equation 1, α may denote path loss attenuation, $\phi_0$ may denote a phase offset, $f_c$ may denote a carrier frequency, $t_d$ may denote a round-trip delay, B may denote a sweep bandwidth of a transmitted chirp, and $T_c$ may denote a chirp duration. In an embodiment, To may denote a direct current constant value. $T_c$ may indicate a same value as $T_{chirp}$ in graph 309.

In some embodiments, multiple radar sensors may be installed in various parts of a vehicle to sense in all directions from the vehicle, and a radar signal processing apparatus may calculate a distance to a target, a direction, and a relative velocity in all directions from the vehicle (i.e., headings) based on information sensed by the plurality of radar sensors. The radar signal processing apparatus may be mounted or incorporated in the vehicle, and may provide various information for various vehicle-related functions (for example, ACC, AEB, BSD, and LCA) that assist driving using the calculated information.

Each of the radar sensors may radiate a respective radar transmission signal including a chirp signal of which a frequency is modulated based on a frequency modulation model and may receive a signal reflected from the target. The radar signal processing apparatus may determine a range from each of the plurality of radar sensors to the target, based on a frequency difference between the radiated radar transmission signal and the received radar reception signal. In addition, in cases where the radar sensor 310 is configured in a plurality of channels, by using phase information of radar data, the radar signal processing apparatus may derive a DOA of the radar reception signal, which is reflected from the target.

The radar sensor 310 may use a wide bandwidth and adopt MIMO to sense with a wide field of view (FoV) and a high resolution (HR), for various applications. A range resolution may be increased by the wide bandwidth, and an angular resolution may be increased by MIMO. The range resolution may represent a smallest unit to discriminate distance information on the target, and the angle resolution may represent a smallest unit to discriminate DOA information on the target. For example, the radar sensor 310 may use a broadband, such as 4 GHz, 5 GHz, or 7 GHz, instead of a narrow band, such as 200 MHz, 500 MHz, or 1 GHz.

The radar sensor 310 may identify a transmission signal of each transmission antenna, based on MIMO through time-division multiplexing (TDM). Based on TDM, since the transmission antennas may need to alternately transmit transmission signals, a time length of the rising interval of a carrier frequency in each transmission signal, that is, a chirp repetition period, may be increased to facilitate the TDM. Due to the reduced rate of change of the frequency of the transmission signal, this may cause reduction in an unambiguously measurable Doppler velocity and/or Doppler frequency. The spectrum analyzer 316 may perform signal processing that is robust against Doppler ambiguity by compensating for a coupling element (discussed next with reference to FIG. 4) between the Doppler frequency and the DOA and/or the Doppler velocity due to movement of a target in a radar system based on TDM MIMO.

Figure 4:
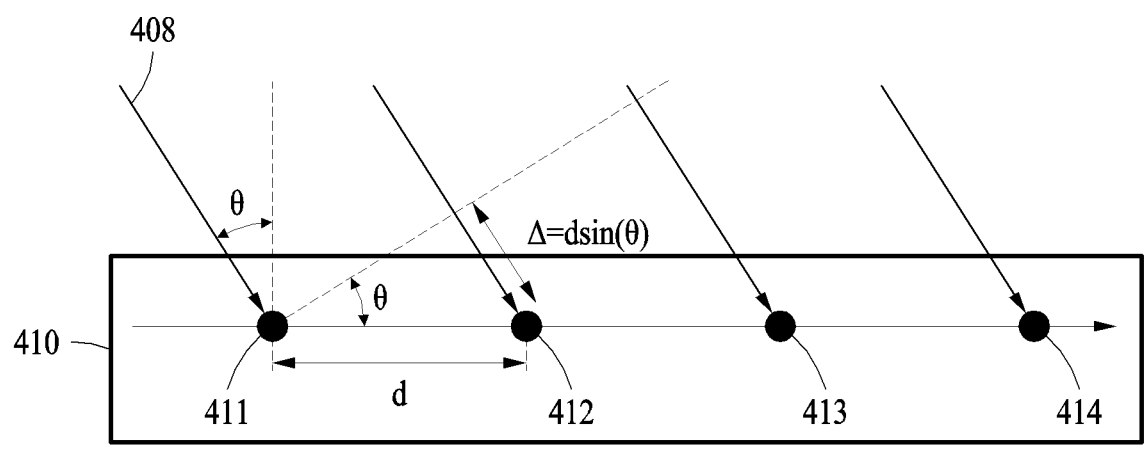
FIG. 4 illustrates an example of a reception antenna array of a radar sensor, according to one or more embodiments.

FIG. 4 illustrates an example of a reception antenna array of a radar sensor. Equation 2 shown below may be derived by analyzing the round-trip delay element of the beat frequency signal of Equation 1.

$$t_d = \frac{2R}{c} = \frac{2(R^0 + R^\theta)}{c} = \frac{2R^0 + d\sin\theta}{c} = t_{d,0} + t_{d,\theta} \quad \text{Equation 2}$$

In Equation 2, R may denote a range between an antenna element and a target, $R^0$ may denote a range between a radar sensor and the target, $R^\theta$ may denote a range difference based on an interval (distance) between antenna elements of the radar sensor, c may denote the velocity of light, and d may denote the interval (distance) between the antenna elements. According to Equation 2, a round-trip element may be decomposed into a range element $t_{d,0}$ and a DOA element $t_{d,\theta}$. Equation 1 may derive Equation 3 shown below, based on the range element $t_{d,0}$ and the DOA element $t_{d,\theta}$ of the round-trip element.

$$y(t) = \frac{\alpha}{2}\cos(\Phi_0 + \Phi_t(t_{d,0}) + \Phi_t(t_{d,\theta})) \quad \text{Equation 3}$$

$$\Phi_0 = -2\pi f_c t_{d,0} + \pi \frac{B}{T_c} t_{d,0}^2 - 2\pi f_c t_{d,\theta} + 2\pi \frac{B}{T_c} t_{d,0} t_{d,\theta} + \pi \frac{B}{T_c} t_{d,\theta}^2$$

$$\Phi_t(t_{d,0}) = -2\pi \frac{B}{T_c} t_{d,0} t$$

$$\Phi_t(t_{d,\theta}) = -2\pi \frac{B}{T_c} t_{d,\theta} t$$

A range to a target may be derived by detecting the $\Phi_t(t_{d,0})$ element through a frequency analysis (for example, a Fourier transform) of a beat frequency signal for each antenna element. A DOA may be estimated by detecting a third term $2\pi f_c t_{d,\theta}$ of the $\Phi_0$ element from a phase change between the antenna elements.

In cases where the radar sensor includes plural reception channels, phase information of radar data may represent a phase difference between a reference phase and a phase of a signal received through each reception channel. The reference phase may be a predetermined phase, or may be set to a phase of one of the reception channels. For example, for a reception antenna element, a radar signal processing apparatus may set a phase of a reception antenna element adjacent to the reception antenna element to the reference phase.

In addition, the radar signal processing apparatus may generate, from the radar data, a radar vector of a dimension corresponding to the number of reception channels of the radar sensor. For example, in case the radar sensor includes four reception channels, the radar signal processing apparatus may generate a four-dimensional vector including a phase value corresponding to each reception channel. The phase value corresponding to each reception channel may be a numerical value representing the phase difference described above.

Below is a description of a case in which the radar sensor is configured in one transmission (Tx) channel and four reception (Rx) channels. A radar signal radiated through the Tx channel may be received through the four Rx channels, after being reflected from a target point. As shown in FIG. 4, in a case where a reception antenna array 410 of the radar sensor includes a first reception antenna element 411, a second reception antenna element 412, a third reception antenna element 413, and a fourth reception antenna element 414, a phase of a signal received by the first reception antenna element 411 may be set to a reference phase. In a case where a radar reflection signal 408, which is reflected from the same target point, is received by the reception antenna array 410, an additional distance Δ between a range from the target point to the first reception antenna element 411 and a range from the target point to the second reception antenna element 412 (i.e., a difference between the two distances) may be represented by Equation 4 shown below.

$$\Delta = d \cdot \sin(\theta) \quad \text{Equation 4}$$

In Equation 4, θ may denote a DOA at which the radar reflection signal 408 is received from the target point, d may denote a distance between the reception antenna elements.

Figure 5:
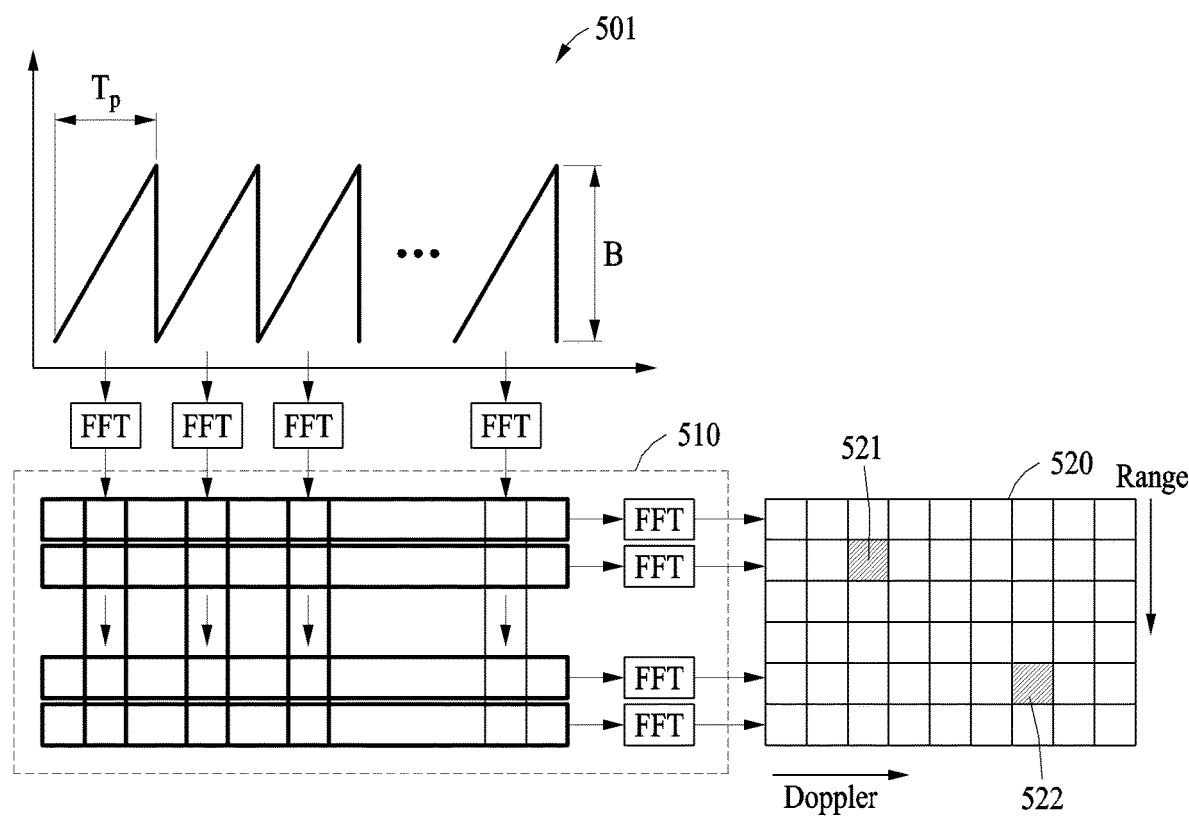
FIG. 5 illustrates an example of an operation of processing a chirp sequence, according to one or more embodiments.

FIG. 5 illustrates an example of an operation of processing a chirp sequence. In case a target is moving, a beat frequency may include a range element based on a range to the target and a Doppler frequency element due to movement of the target.

$$f_B = f_R - f_D = \frac{B}{T_{chirp}} \frac{2R^0}{c} + \frac{2v}{\lambda} \quad \text{Equation 5}$$

In Equation 5, $f_R$ may denote a range element, $f_D$ may denote a Doppler frequency element, λ may denote a wavelength, and v may denote a velocity of a target. The velocity of the target may be calculated by frequency conversion 510 of FIG. 5.

Referring to FIG. 5, radar data 501 may include a chirp duration $T_p$ and a chirp sequence of a bandwidth B. The radar signal processing apparatus may generate a range-Doppler map 520 by performing frequency conversion 510 on the radar data 501. For example, the frequency conversion 510 may be a two-dimensional (2D) Fourier transform including a first Fourier transform based on a range and a second Fourier transform based on a Doppler frequency. Here, the first Fourier transform may be a range-FFT, the second Fourier transform may be a Doppler FFT, and the 2D Fourier transform may be a 2D FFT. The radar signal processing apparatus may perform the range-FFT based on a chirp sequence of the radar data 501, and may perform the Doppler FFT based on a result of the range-FFT.

The radar signal processing apparatus may detect target cells 521 and 522 in the range-Doppler map 520. For example, the radar signal processing apparatus may detect the first and second target cells 521 and 522 through CFAR on the range-Doppler map 520. CFAR may be a thresholding-based detection method. Hereinafter, an operation of determining a Doppler velocity of a first target corresponding to the first target cell 521 of the target cells 521 to 522 is described. However, the operation may be applicable to a target of the other target cell, that is, the second target cell 522.

The radar signal processing apparatus may determine an ambiguous Doppler velocity of the first target based on first frequency information of the first target cell 521. For example, the first target cell 521 may correspond to a maximum intensity in a Doppler spectrum of the radar data 501, and the first frequency information may represent a doppler frequency with the maximum intensity. The radar signal processing apparatus may determine a Doppler velocity corresponding to the Doppler frequency to be the ambiguous Doppler velocity. A relationship between an unambiguous Doppler velocity and the ambiguous Doppler velocity may be represented by Equation 6 shown below.

$$v_{D,unamb} = v_{D,amb} + q \cdot (2v_{D,max}) \qquad \text{Equation 6}$$

In Equation 6, $v_{D,unamb}$ may denote an unambiguous Doppler velocity, $v_{D,amb}$ may denote an ambiguous Doppler velocity, q may denote an ambiguity number, and $v_{D,max}$ may denote a maximum range of unambiguously measurable Doppler velocity by a chirp sequence signal. q may have an integer value.

Figure 6A:
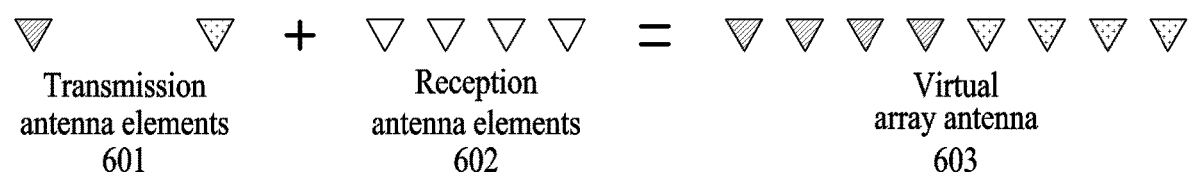
FIGS. 6A to 6D illustrate an example of Doppler ambiguity and a motion-induced phase error, according to one or more embodiments.

FIGS. 6A to 6D illustrate an example of Doppler ambiguity and a motion-induced phase error. Referring to FIG. 6A, a virtual array antenna 603 may be implemented based on transmission antenna elements 601 and reception antenna elements 602. To implement the virtual array antenna 603, a system may identify which antenna signal of the reception antenna elements 601 corresponds to a reflected signal received by the reception antenna elements 602. According to an example embodiment, the virtual array antenna 603 may be implemented by TDM.

Figure 6B:
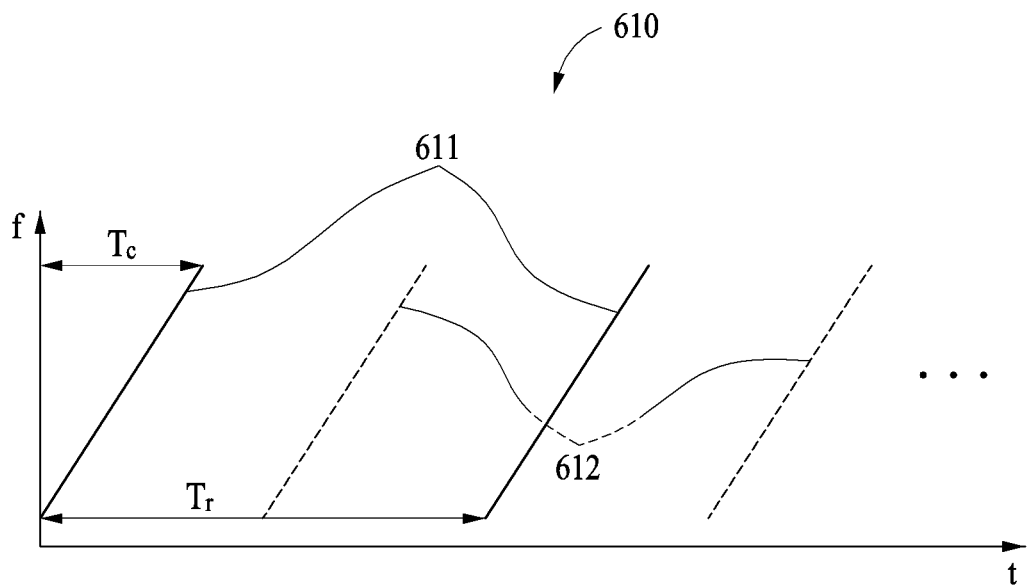

Referring to FIG. 6B, a radar transmission signal 610 may be a chirp sequence that includes a first chirp sequence signal 611 and a second chirp sequence signal 612. For example, the first chirp sequence signal 611 may be transmitted by a first transmission antenna in a MIMO array antenna, and the second chirp sequence signal 612 may be transmitted by a second transmission antenna. In FIG. 6B, $T_c$ may represent a chirp duration of the first chirp sequence signal 611, and $T_r$ may represent a repetition period of the chirp sequence.

In a method using a chirp sequence waveform, a range of a measurable Doppler velocity may be limited by the chirp repetition period. A maximum value of a measurable Doppler frequency may be represented by Equation 7 shown below.

$$f_{D,max} = \frac{1}{2T_p} \qquad \text{Equation 7}$$

In Equation 7, $f_{D,max}$ may denote a maximum value of an unambiguously measurable Doppler frequency. A maximum range of the unambiguously measurable Doppler frequency may be represented by $-f_{D,max}$ to $f_{D,max}$. As shown in Equation 7, $f_{D,max}$ may be dependent on $T_p$. Based on Equation 8 representing a relationship between a Doppler velocity and a Doppler frequency, Equation 9 may be derived.

$$f_D = -\frac{2}{\lambda} v \qquad \text{Equation 8}$$

$$v_{D,max} = \frac{\lambda}{4T_p} \qquad \text{Equation 9}$$

In Equation 8, $f_D$ may denote a Doppler frequency, λ may denote a wavelength, and v may denote a Doppler velocity. In Equation 9, $v_{D,max}$ may denote a maximum value of an unambiguously measurable Doppler velocity. A maximum range of the unambiguously measurable Doppler velocity may be represented by $-v_{D,max}$ to $v_{D,max}$. A sign may be omitted in a process of deriving Equation 9 through Equations 7 and 8, based on a meaning of the maximum value. In addition, since the Doppler velocity and the Doppler frequency may each be converted to the other through Equation 8, a description of the Doppler velocity may be applicable to the Doppler frequency, and vice versa (within an acceptable range).

In a case where the radar transmission signal 610 only includes the first chirp sequence signal 611, a chirp repetition period of the radar transmission signal 610 may be $T_c$. Alternatively, in case the radar transmission signal 610 includes both the first chirp sequence signal 611 and the second chirp sequence signal 612 for TDM implementation, the chirp repetition period of the radar transmission signal 610 may be $T_r$. In this case, a range of the unambiguously measurable Doppler velocity may decrease due to an increase in the chirp repetition period. In this example, where $T_r$ is twice $T_c$, a measurable range of the Doppler velocity may be reduced to ½.

Figure 6C:
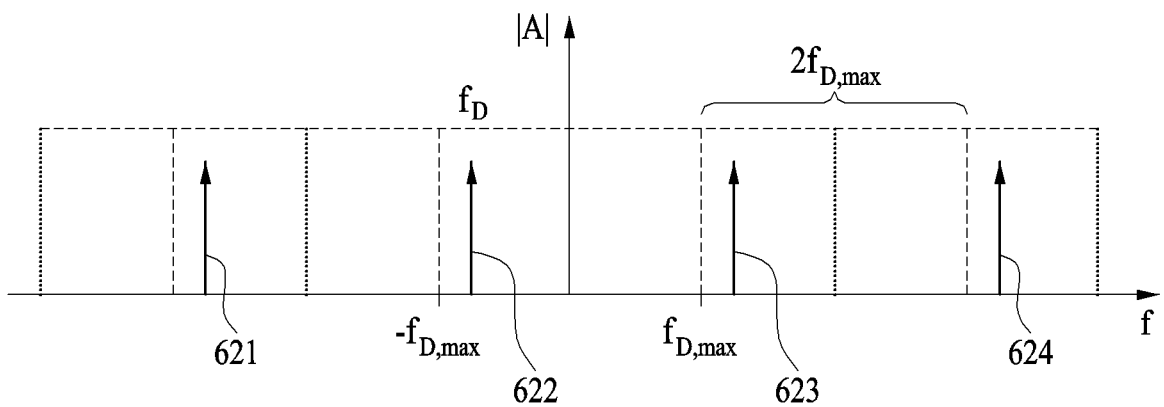

In a case where a velocity of a target falls outside a maximum measurable velocity range, there may be a Doppler ambiguity issue for the velocity of the target. The Doppler ambiguity is further described with reference to FIG. 6C. FIG. 6C illustrates a measurable frequency range and an aliasing effect. For example, a frequency value 622 may be measured as a Doppler frequency $f_D$ of a target through a Doppler spectrum of a radar reception signal. However, due to the aliasing effect, other frequency values 621, 623, and 624 can also potentially be determined to be the Doppler frequency $f_D$ of the target. Therefore, whether the frequency value 622 corresponds to an actual Doppler frequency $f_D$ of the target may be ambiguous. This Doppler ambiguity may be theoretically solved by shortening a repetition period of a chirp sequence, however, hardware limitations on frequency of sampling a reflected signal, shortening the repetition period of the chirp sequence may reduce a measurable range. In cases of using TDM MIMO, the Doppler ambiguity may impose a problem since the repetition period of the chirp sequence increases as the number of operating transmission antenna elements increases.

The Doppler ambiguity may cause an error in estimating a velocity of the target as well as estimating a DOA of the target. Equation 10 may be derived by adding a Doppler frequency element to the beat frequency signal model of Equation 3.

$$y(t, l, n, m) = \qquad \text{Equation 10}$$
$$\frac{\alpha}{2} \cos\left(-2\pi\left(\frac{B}{T_{chirp}} \frac{2R^0}{c} + \frac{2v}{\lambda}\right)t - 2\pi\left(\frac{-2v}{\lambda}\right) \cdot l \cdot T_p - \right.$$
$$\left. 2\pi \frac{(n-1)}{\lambda} \cdot d \cdot \sin\theta - 2\pi\left(\frac{-2v}{\lambda}\right) \cdot \frac{(m-1)}{M} \cdot T_p \right)$$

In Equation 10, the first element denotes a distance to a target, the second element denotes a moving velocity of the target, the third element denotes a DOA of the target, and the fourth element denotes a motion-induced phase error. In Equation 10, l denotes a chirp index, n denotes an antenna number (for example, an antenna number in a uniform linear array), m denotes a transmission activation order within a chirp repetition period, $T_{chirp}$ denotes a chirp duration, $T_p$ denotes a repetition period of a chirp sequence, and M denotes the number of transmission antenna elements. Based on the four elements of Equation 10, a phase of a beat frequency signal may be determined.

Figure 6D:
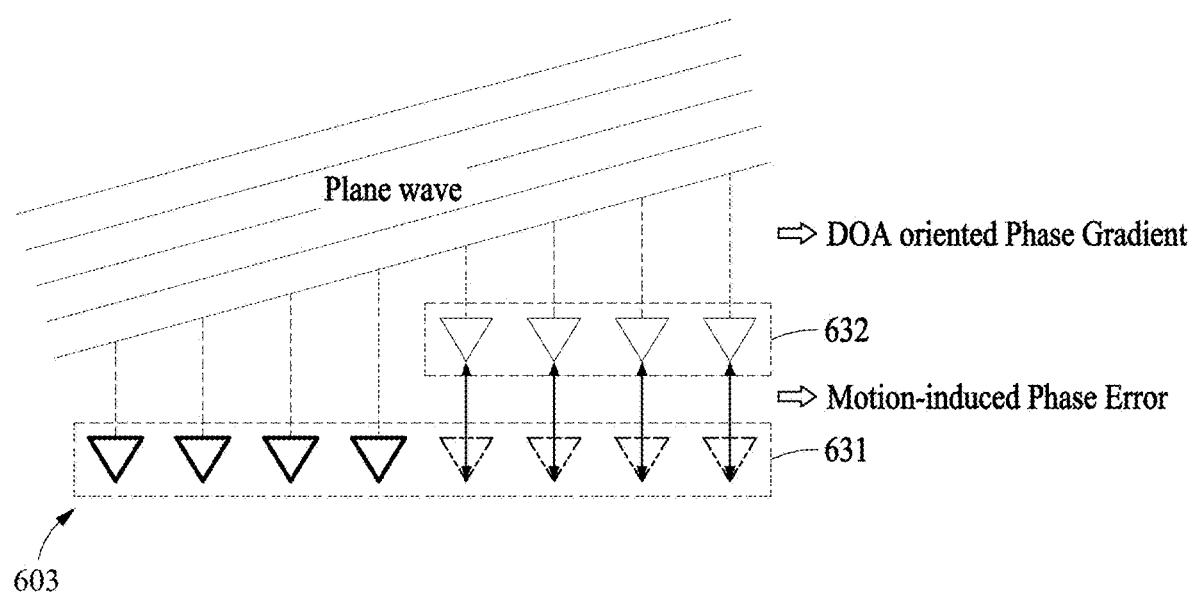

FIG. 6D represents a case in which the transmission antenna elements 601 and the reception antenna elements 602 of FIG. 6A form the virtual array antenna 603, the transmission antenna elements 601 transmit the radar transmission signal 610 of FIG. 6B, and the reception antenna elements 602 receive a plane wave corresponding to a reflected signal of the radar transmission signal 610.

Due to a TDM characteristic of the radar transmission signal 610, an effect may occur where the reception antenna elements 602 receive a reflected signal of the first chirp sequence signal 611 at a first time 631, and receive a reflected signal of the second chirp sequence signal 612 at a second time 632. The effect may be applied as the motion-induced phase error. Therefore, estimating a DOA-oriented phase gradient by considering the motion-induced phase error may be helpful. A motion-induced phase error model of Equation 11 may be derived based on the Doppler ambiguity of Equation 6 and the motion-induced phase error element of Equation 10.

$$s_{mc} = e^{j2\pi \cdot \frac{2v_{D,unamb}}{\lambda} \cdot \left(\frac{m-1}{M}\right) \cdot T_r} = e^{j2\pi \cdot \frac{2(v_{D,amb} + q \cdot 2v_{D,max})}{\lambda} \cdot \left(\frac{m-1}{M}\right) \cdot T_r} =$$
$$e^{j2\pi \cdot \frac{2\left(v_{D,amb} + q \cdot \frac{2\lambda}{4T_r}\right)}{\lambda} \cdot \left(\frac{m-1}{M}\right) \cdot T_r} = e^{j2\pi \left(\frac{2v_{D,amb}}{\lambda} \cdot \left(\frac{m-1}{M}\right) \cdot T_r + q \cdot \left(\frac{m-1}{M}\right) \cdot T_r\right)} =$$
$$e^{j2\pi \cdot \frac{2v_{D,amb}}{\lambda} \cdot \left(\frac{m-1}{M}\right) \cdot T_r} \cdot e^{j2\pi \cdot q \cdot \left(\frac{m-1}{M}\right)}$$

Equation 11

In Equation 11, $s_{mc}$ denotes a motion-induced phase error model. Equation 6 represents the ambiguous Doppler velocity, the unambiguous Doppler velocity, the Doppler ambiguity number, and a relationship between the maximum measurable Doppler velocity. By substituting the relationship based on Equation 6 into the motion-induced phase error element of Equation 10, Equation 11 may be derived. In Equation 11, $v_{D,unamb}$ denotes an unambiguous Doppler velocity. $v_{D,unamb}$ may be obtained after solving the Doppler ambiguity. $v_{D,amb}$ denotes an ambiguous Doppler velocity. $v_{D,amb}$ may be obtained based on frequency conversion (for example, the frequency conversion 510). $v_{D,max}$ denotes a maximum range of an unambiguously measurable Doppler velocity through a classical chirp sequence. Accordingly, in $s_{mc}$, $$e^{j2\pi \cdot \frac{2v_{D,amb}}{\lambda} \cdot \left(\frac{m-1}{M}\right) \cdot T_r}$$

may be referred to as an unambiguous element, and $$e^{j2\pi \cdot q \cdot \left(\frac{m-1}{M}\right)}$$

may be referred to as an ambiguous element. The unambiguous element may be independent from the Doppler ambiguity number, and the ambiguous element may be dependent on the Doppler ambiguity number. To improve DOA estimation accuracy through $s_{mc}$, a problem of ambiguity of a moving velocity of a target may be solved.

Various methods, such as variable carrier frequency (VCF), multiple pulse repetition frequency (MPRF), staggered pulse repetition frequency (SPRF), and random transmission (Tx), may be useful with respect to the Doppler ambiguity problem. In a random Tx plus VCF method, a Doppler ambiguity problem caused by TDM MIMO may be solved by the random Tx method, and a Doppler ambiguity problem caused by a significantly high speed of the target may be solved by the VCF method.

In the random Tx plus VCF method, it may be helpful for a motion-induced phase error element caused by a moving velocity of a target to be corrected for DOA estimation of the target, and for this, the Doppler ambiguity may be processed first. However, in processing the Doppler ambiguity, a TDM MIMO-oriented Doppler ambiguity may be removed by beamforming (BF) preprocessing and Doppler FFT, and the Doppler ambiguity caused by a significantly large value of absolute moving speed of the target may be removed by estimating an ambiguity number through the VCF method. However, since an actual beat frequency signal typically includes components such as system noise and environment clutter, accurate estimation of the ambiguity number in a unit of points may be difficult. Instead, the accuracy of estimating the ambiguity number may be improved by a method of aggregating (for example, averaging, voting, etc.) an ambiguity number estimated in an intra-cluster by using a clustering result. Therefore, clustering may be performed for solving the Doppler ambiguity problem for accurate DOA estimation. However, a DOA of the target may be needed to calculate a position value of the target, which is then used as an input to the clustering.

According to an example embodiment, the radar signal processing apparatus may determine individual DOA data, which is split corresponding to each transmission antenna element. The radar signal processing apparatus may determine an unambiguous element of a phase error element by applying an unambiguous Doppler velocity based on radar data to a motion-induced phase error element of the individual DOA data. The radar signal processing apparatus may also determine integrated DOA data corresponding to the transmission antenna elements by integrating the individual DOA data of which an ambiguous element of the phase error element is constrained.

Since the individual DOA data is segmented based on each transmission antenna, the Doppler ambiguity problem due to TDM MIMO may be reduced or avoided. The radar signal processing apparatus may transmit a radar signal at a transmission time interval based on a TDM latency through reception antenna elements of a radar sensor, may receive a reflected signal of the radar signal through the reception antenna elements of the radar sensor, and may determine the individual DOA data corresponding to the transmission antenna elements by classifying, according to the transmission antenna elements, radar data corresponding to the reflected signal based on the transmission time interval. The radar signal processing apparatus may obtain the individual DOA data by splitting 3D data (of range-chirp sequence-BF DOA in a BF preprocessing process) into a TDM latency unit.

The radar signal processing apparatus may determine an unambiguous Doppler velocity by performing a 2D Fourier transform based on the radar data, and may apply the unambiguous Doppler velocity to the motion-induced phase error element of the individual DOA data. More specifically, the radar signal processing apparatus may sequentially perform range-FFT, BF preprocessing, Doppler FFT, and CFAR, based on radar data corresponding to an IF signal. The individual DOA data may be determined based on BF preprocessing, and the ambiguous Doppler velocity may be determined based on Doppler FFT. The unambiguous element of the motion-induced phase error element may be determined based on one-dimensional motion compensation through the ambiguous Doppler velocity.

Remaining unambiguous elements of the motion-induced phase error element may be constrained in a process of integrating the individual DOA data. For example, the ambiguous element may be constrained through an absolute value operation or activation order arrangement. This integration method may facilitate avoidance of the Doppler ambiguity problem due to TDM MIMO of the individual DOA data.

Figure 7:
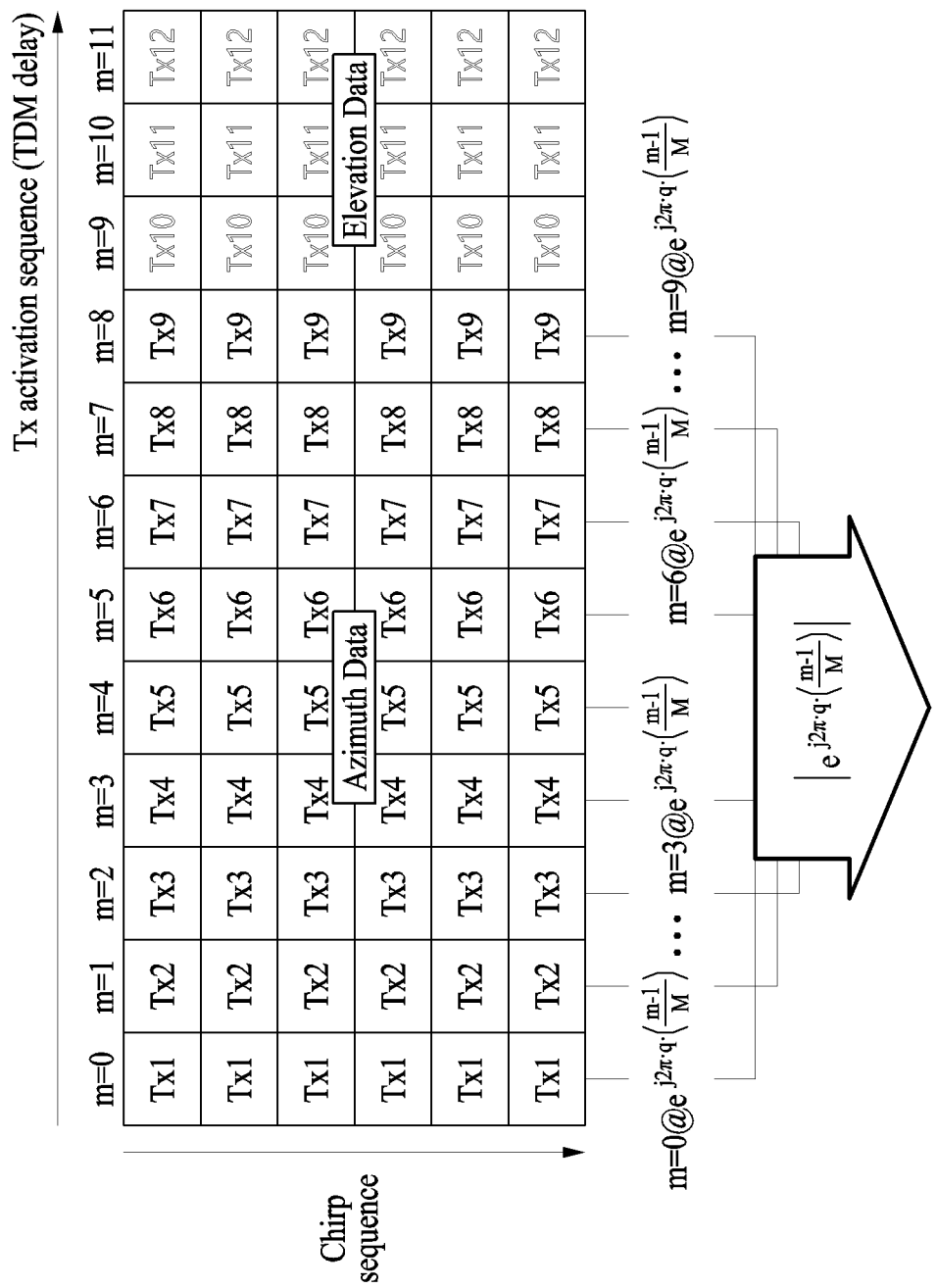
FIG. 7 illustrates an example of an operation of constraining an ambiguous element of a phase error component by an absolute value operation, according to one or more embodiments.

FIG. 7 illustrates an example of an operation of constraining an ambiguous element of a phase error element by an absolute value operation. Referring to FIG. 7, the number of transmission antenna elements may be M=12, for example. A first transmission antenna element Tx1 to a ninth transmission antenna element Tx9 may be used for generating azimuth data, and a tenth transmission antenna element Tx10 to a twelfth transmission antenna element Tx12 may be used for generating elevation data. A description below representatively describes generating the azimuth data, however, the description is applicable to generating the elevation data.

The transmission antenna elements may transmit a radar signal based on a transmission activation order m. For example, the first transmission antenna element Tx1 may transmit a radar signal at m=0, and the second transmission antenna element Tx2 may transmit a radar signal at m=1. The transmission activation order m may correspond to a TDM latency. The radar signal may be transmitted at a transmission time interval based on the TDM latency. For example, a radar signal may be transmitted at a transmission time interval corresponding to on a chirp duration.

The radar signal processing apparatus may classify, according to the transmission antenna elements, radar data corresponding to a reflected signal based on the transmission time interval, and may determine individual DOA data corresponding to the transmission antenna elements. For example, the radar signal processing apparatus may determine first individual DOA data corresponding to the first transmission antenna element Tx1, based on radar data corresponding to m=0, may determine second individual DOA data corresponding to the second transmission antenna element Tx2, based on radar data corresponding to m=1, and so on.

A motion-induced phase error of the individual DOA data may include an unambiguous element $$e^{j2\pi \cdot \frac{2v_{D,amb}}{\lambda} \cdot \left(\frac{m-1}{M}\right) \cdot T_r}$$

and an ambiguous element $$e^{j2\pi \cdot q \cdot \left(\frac{m-1}{M}\right)}.$$

The radar signal processing apparatus may determine an unambiguous element $$e^{j2\pi \cdot \frac{2v_{D,amb}}{\lambda} \cdot \left(\frac{m-1}{M}\right) \cdot T_r}$$

based on an ambiguous Doppler velocity $v_{D,amb}$, and may remove or suppress an ambiguous element $$e^{j2\pi \cdot q \cdot \left(\frac{m-1}{M}\right)}$$

by an absolute value operation. The radar signal processing apparatus may determine integrated DOA data, while the ambiguous element is constrained, by integrating the individual DOA data by applying an absolute value to the ambiguous element. Through the absolute value operation, a phase element of the ambiguous element in the individual DOA data may be removed, and the integrated DOA data may be determined by integrating absolute values of the ambiguous element. Integrated DOA data on the first transmission antenna element Tx1 to the ninth transmission antenna element Tx9 may be determined by integrating pieces of individual DOA data respectively corresponding to the first transmission antenna element Tx1 to the ninth transmission antenna element Tx9.

Figure 8:
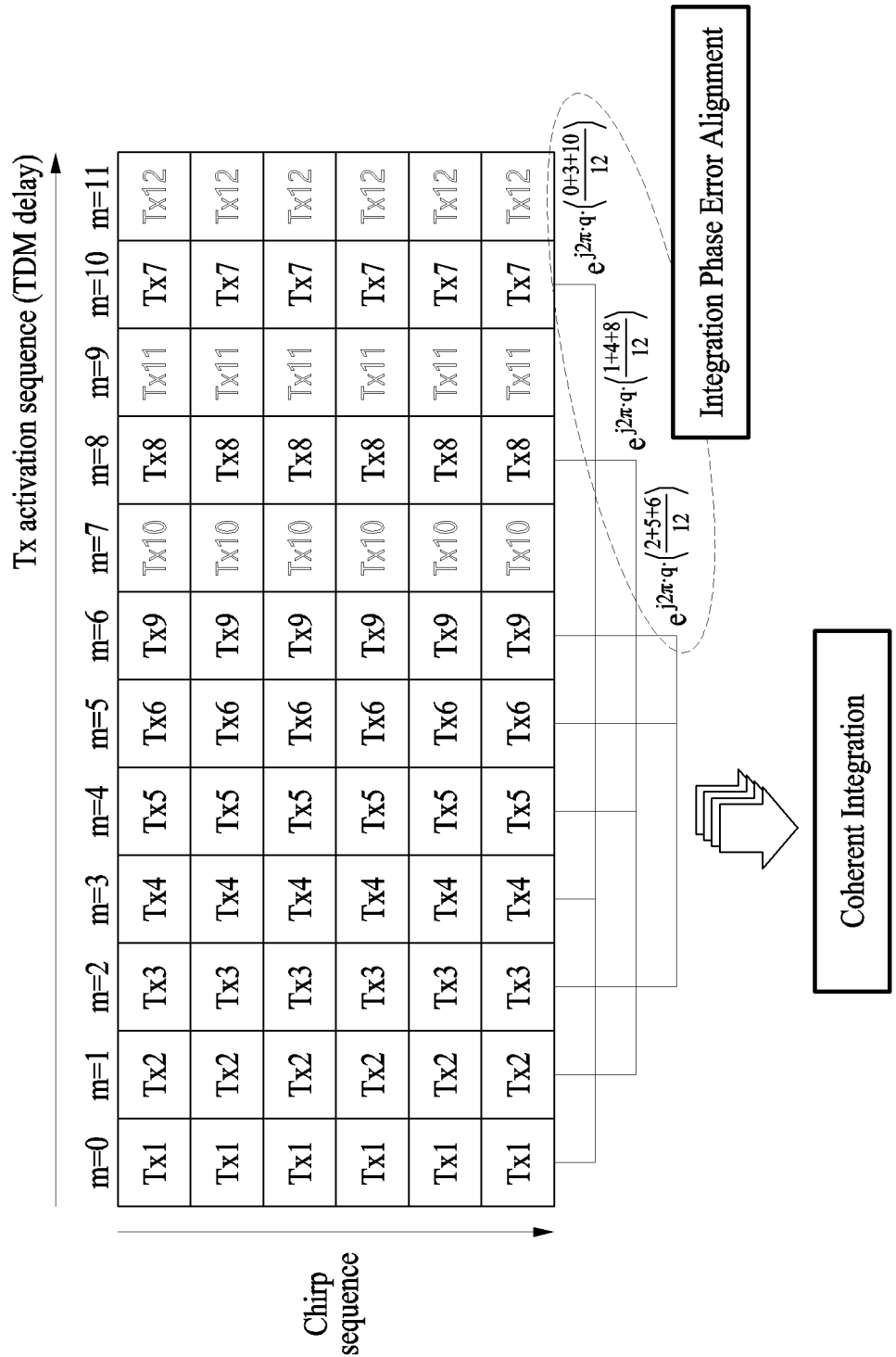
FIG. 8 illustrates an example of an operation of constraining an ambiguous element of a phase error component by activation order arrangement, according to one or more embodiments.

FIG. 8 illustrates an example of an operation of constraining an ambiguous element of a phase error element by activation order arrangement, according to one or more embodiments. Referring to FIG. 8, transmission antenna elements may transmit a radar signal in an activation order, which may be different from a disposition (location) order in a radar sensor. The activation order may correspond to a value m. For example, the transmission antenna elements may be sequentially disposed from a first transmission antenna element Tx1 to a twelfth transmission antenna element Tx12 in the radar sensor, however, the transmission antenna elements may be activated in a different order from the disposition order and may transmit the radar signal. For example, referring to FIG. 8, the ninth transmission antenna element Tx9 may transmit a radar signal when m=6, not m=8.

The radar signal processing apparatus may classify the transmission antenna elements into transmission groups of which sums of order values based on the activation order are the same. For example, a sum of order values of a first transmission group including the transmission antenna elements Tx3, Tx6, and Tx9 may be 2+5+6=13, a sum of order values of a second transmission group including the transmission antenna elements Tx2, Tx5, and Tx8 may be 1+4+8=13, and a sum of order values of a third transmission group including the transmission antenna elements Tx1, Tx4, and Tx7 may be 0+3+10=13, and thus, the transmission antenna elements Tx1 to Tx9 may be classified into the first to third transmission groups.

The radar signal processing apparatus may determine intermediate data by integrating individual DOA data by the transmission groups, and may determine the integrated DOA data by integrating the intermediate data. Since the transmission groups are arranged based on a same TDM latency value, in a process of integrating the intermediate data, an ambiguous element of the intermediate data of each of the transmission groups may not function as an error between the transmission groups. The TDM latency value may function as an offset in the integrated DOA data. The integrated DOA data may include an offset corresponding to the sum of the order values.

Figure 9:
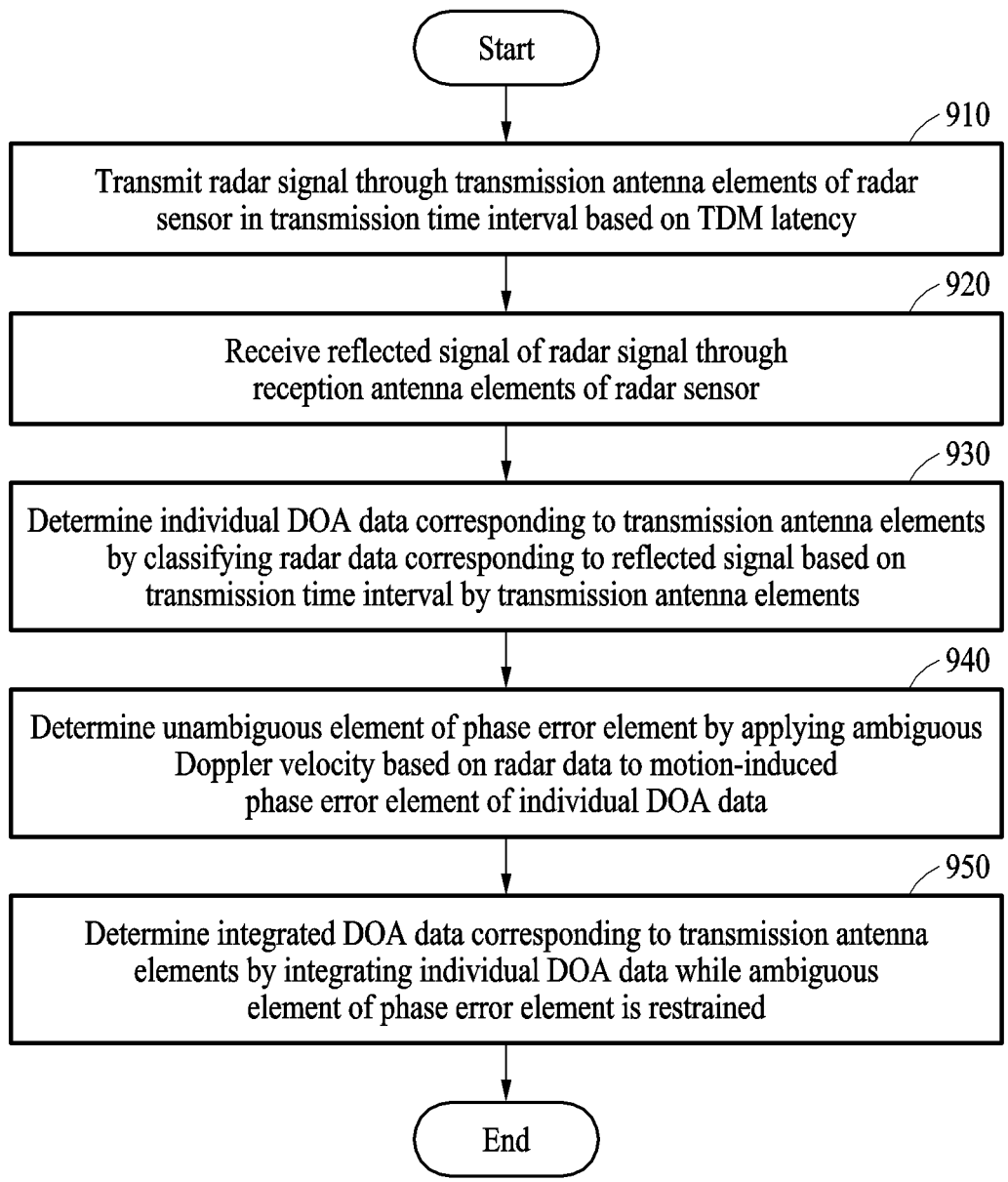
FIG. 9 illustrates an example of a radar signal processing method, according to one or more embodiments.

FIG. 9 illustrates an example of a radar signal processing method, according to one or more embodiments. Referring to FIG. 9, in operation 910, the radar signal processing apparatus may transmit a radar signal through transmission antenna elements of a radar sensor at a transmission time interval based on a TDM latency. In operation 920, the radar signal processing apparatus may receive a reflected signal of the radar signal through reception antenna elements of the radar sensor. In operation 930, the radar signal processing apparatus may classify, according to the transmission antenna elements, radar data corresponding to the reflected signal based on the transmission time interval, and may determine individual DOA data corresponding to the transmission antenna elements.

In operation 940, the radar signal processing apparatus may determine an unambiguous element of a phase error element by applying an ambiguous Doppler velocity (based on the radar data) to a motion-induced phase error element of the individual DOA data. The radar signal processing apparatus may determine the ambiguous Doppler velocity by performing a 2D Fourier transform based on the radar data. The 2D Fourier transform may include a Fourier transform based on a range and a Fourier transform based on a Doppler frequency. Ambiguity of the ambiguous Doppler velocity may correspond to an aliasing effect.

In operation 950, the radar signal processing apparatus may determine integrated DOA data by integrating individual DOA data while constraining or suppressing the ambiguous element of the phase error element. According to an example embodiment, the radar signal processing apparatus may integrate individual DOA data based on an absolute value of the ambiguous element of the phase error element. According to another example embodiment, the transmission antenna elements may transmit the radar signal in an activation order, which may be different from their positional order in the radar sensor, and may be classified into transmission groups of which sums of order values based on the activation order are the same. The radar signal processing apparatus may determine intermediate data by integrating the individual DOA data based on the transmission groups and may determine integrated DOA data by integrating the intermediate data.

An unambiguous element and an ambiguous element of the phase error element may be distinguished from one another based on a relationship between an ambiguous Doppler velocity, an unambiguous Doppler velocity, a Doppler ambiguity number, and a maximum range of a measurable Doppler velocity. The unambiguous element of the phase error element may be independent from the Doppler ambiguity number, and the ambiguous element of the phase error element may be dependent on the Doppler ambiguity number.

In addition, descriptions with reference to FIGS. 1 to 8 and FIG. 10 may be applicable to the radar signal processing methods and performed by the radar signal processing methods.

Figure 10:
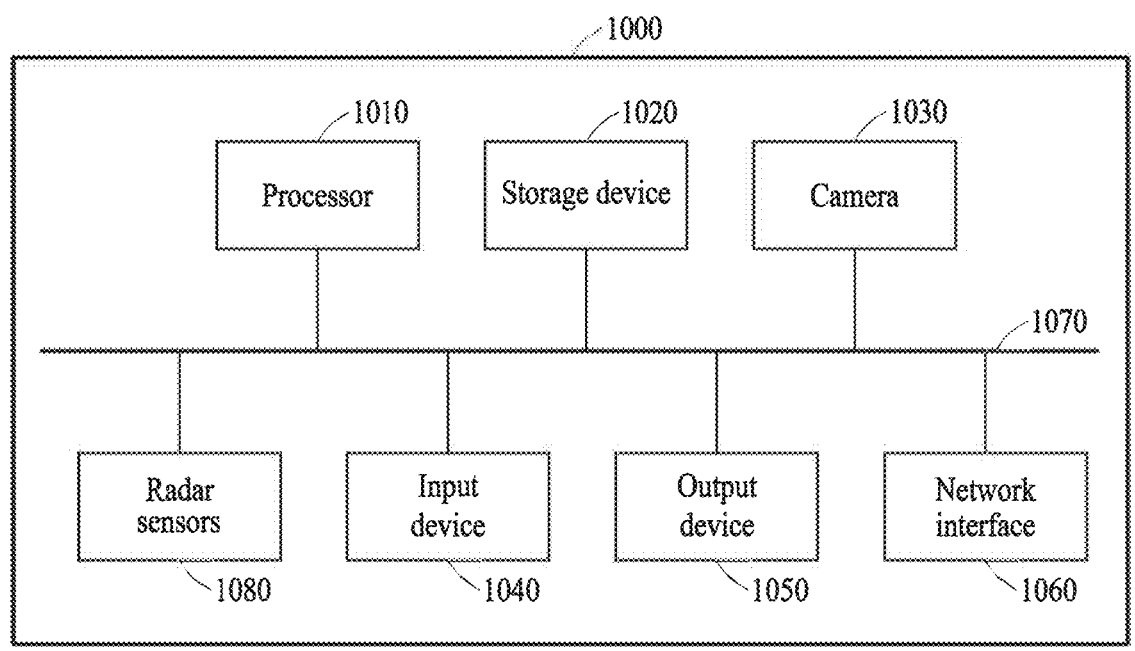
FIG. 10 illustrates an example of a configuration of an electronic device, according to one or more embodiments.

FIG. 10 illustrates an example of a configuration of an electronic device, according to one or more embodiments. Referring to FIG. 10, an electronic device 1000 may perform the radar signal processing method described above. For example, the electronic device 1000 may functionally and/or structurally include the radar signal processing apparatus 200 of FIG. 2. The electronic device 1000 may be, for example, an image processing device, a smart phone, a wearable device, a tablet computer, a netbook, a laptop, a desktop, a personal digital assistant (PDA), a head-mounted display (HMD), a vehicle (for example, autonomous vehicle), or a driver-assistance device to be mounted on or incorporated in a vehicle.

Referring to FIG. 10, the electronic device 1000 may include a processor 1010, a storage device 1020, a camera 1030, an input device 1040, an output device 1050, and a network interface 1060. The processor 1010, the storage device 1020, the camera 1030, the input device 1040, the output device 1050, and the network interface 1060 may communicate with each other via a communication bus 1070.

The processor 1010 may execute instructions or functions to be executed in the electronic device 1000. For example, the processor 1010 may process the instructions stored in the storage device 1020. The processor 1010 may perform the operations described through FIGS. 1 to 9. The instructions may be processor-executable instructions, intermediate code, bytecode, source code, and/or the like.

In an example, the electronic device may include radar sensors 1080, e.g., radar sensor(s) of FIG. 2 and/or FIG. 3.

The storage device 1020 may store information or data necessary for the execution of the processor 1010. The storage device 1020 may include a computer-readable storage medium or a computer-readable storage device. The storage device 1020 may store instructions to be executed by the processor 1010 and may store related information while software and/or an application is executed by the electronic device 1000.

The camera 1030 may capture an image including a plurality of image frames. For example, the camera 1030 may generate a frame image.

The input device 1040 may receive an input from a user through a haptic, video, audio, or touch input. The input device 1040 may include a keyboard, a mouse, a touch screen, a microphone, or any other device that detects the input from the user and transmits the detected input.

The output device 1050 may provide an output of the electronic device 1000 to the user through a visual, auditory, or haptic channel. The output device 1050 may include, for example, a display, a touch screen, a speaker, a vibration generator, or any other device that provides the output to the user. The network interface 1060 may communicate with an external device through a wired or wireless network. The output device 1050 may provide a result of processing radar data to the user using at least one of visual information, auditory information, and haptic information.

For example, in cases where the electronic device 1000 is mounted on or incorporated in a vehicle, the electronic device 1000 may display a radar image map through a display. As another example, the electronic device 1000 may change any one or any combination of the velocity, the acceleration, and the steering of the vehicle equipped with the electronic device 1000 based on DOA information, range information, and/or the radar image map. However, examples are not limited thereto, and the electronic device 1000 may perform functions such as ACC, AEB, BSD, LCA, and ego-localization. The electronic device 1000 may structurally and/or functionally include a control system for such control of the vehicle.

The computing apparatuses, the vehicles, the electronic devices, the processors, the memories, the image sensors, the vehicle/operation function hardware, the ADAS/autonomous driving systems, the displays, the information output system and hardware, the storage devices, and other apparatuses, devices, units, modules, and components described herein with respect to FIGS. 1-10 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIM D) multiprocessing, multiple-instruction single-data (MISD) multiprocessing, and multiple-instruction multiple-data (MIMD) multiprocessing.

The methods illustrated in FIGS. 1-10 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A method comprising:
   transmitting, through transmission antenna elements of a radar sensor, a radar signal at a transmission time interval corresponding to a time division multiplexing (TDM) latency, wherein the radar signal is for a TDM-based multiple-input multiple-output (MIMO) radar system comprising the radar sensor;

receiving a reflected signal of the radar signal through reception antenna elements of the radar sensor;

determining directions of arrival (DOAs) respectively corresponding to the transmission antenna elements by classifying radar data corresponding to the reflected signal, wherein the classifying is based on the transmission time interval;

determining an unambiguous element of a phase error element by applying an ambiguous Doppler velocity that is based on the radar data to the phase error element of the individual DOA data; and determining integrated DOA data corresponding to the transmission antenna elements by integrating the individual DOA data by suppressing an ambiguous element of the phase error element.

2. The method of claim 1, wherein the determining of the integrated DOA data comprises integrating the individual DOA data based on an absolute value of the ambiguous element of the phase error element.

3. The radar signal processing-method of claim 1, wherein the transmission antenna elements transmit the radar signal in an activation order, which is different from a physical order of the transmission antenna elements.

4. The method of claim 3, wherein the transmission antenna elements are classified into a transmission group of which sums of order values based on the activation order are the same, and wherein the determining of the integrated DOA data further comprises determining intermediate data by integrating the individual DOA data by the transmission group; and wherein the method further comprises:
determining the integrated DOA data by integrating the intermediate data.

5. The method of claim 4, wherein the integrated DOA data comprises an offset corresponding to the sums of the order values.

6. The method of claim 1, wherein the ambiguous Doppler velocity is determined by performing a two-dimensional (2D) Fourier transform based on the radar data.

7. The method of claim 6, wherein the 2D Fourier transform comprises a Fourier transform based on a range and a Fourier transform based on a Doppler frequency.

8. The method of claim 1, wherein the unambiguous element and the ambiguous element of the phase error element are discriminated from one another based on a relationship between the ambiguous Doppler velocity, an unambiguous Doppler velocity, a Doppler ambiguity number, and a maximum range of a measurable Doppler velocity.

9. The method of claim 8, wherein the unambiguous element of the phase error element is independent from the Doppler ambiguity number, and
the ambiguous element of the phase error element is dependent on the Doppler ambiguity number.

10. The method of claim 1, wherein an ambiguity of the ambiguous Doppler velocity is induced by an aliasing effect.

11. The method of claim 1, wherein the unambiguous element of the phase error element is motion-induced.

12. The method of claim 1, wherein the suppressing the ambiguous element of the phase error element is based on the unambiguous element of the phase error.

13. A non-transitory computer-readable storage medium storing instructions that, when executed by a processor, cause the processor to perform the method of claim 1.

14. A system comprising:
a processor configured to:
transmit a radar signal for a TDM-based MIMO radar system at a transmission time interval based on a TDM latency through one or more transmission antenna elements of a radar sensor,
receive a reflected signal of the radar signal through reception antenna elements of the radar sensor,
determine individual DOA data corresponding to the transmission antenna elements by classifying, according to the transmission antenna elements, radar data corresponding to the reflected signal based on the transmission time interval,
determine an unambiguous element of a phase error element by applying an ambiguous Doppler velocity that is based on the radar data to the phase error element of the individual DOA data, and
determine integrated DOA data corresponding to the transmission antenna elements by integrating the individual DOA data by suppressing an ambiguous element of the phase error element.

15. The system of claim 14, wherein the processor is further configured to integrate the individual DOA data based on an absolute value of the ambiguous element of the phase error element.

16. The radar signal processing apparatus of claim 14, wherein the transmission antenna elements transmit the radar signal in an activation order, which is different from a physical order of the transmission antenna elements in the radar sensor.

17. The system of claim 16, wherein the transmission antenna elements are classified into a transmission group of which a sum of order values based on the activation order is same, and wherein the processor is further configured to:
determine intermediate data by integrating the individual DOA data by the transmission group, and
determine the integrated DOA data by integrating the intermediate data.

18. The system of claim 14, wherein the unambiguous element and the ambiguous element of the phase error element are discriminated from one another based on a relationship between the ambiguous Doppler velocity, an unambiguous Doppler velocity, a Doppler ambiguity number, and a maximum range of a measurable Doppler velocity.

19. The system of claim 18, wherein the unambiguous element of the phase error element is independent from the Doppler ambiguity number, and wherein the ambiguous element of the phase error element is dependent on the Doppler ambiguity number.

20. The system of claim 14, wherein the unambiguous element of the phase error element is motion-induced.

21. The system of claim 14, wherein the system is an electronic device that further comprises the radar sensor.

22. The system of claim 21, wherein the electronic device is a vehicle, and wherein the integrated DOA data is for controlling the vehicle.

23. A vehicle comprising:
a radar sensor comprising an array antenna, wherein the radar sensor is configured to implement TDM-based MIMO using transmission antenna elements and reception antenna elements;
a processor configured to:
control transmission, through the transmission antenna elements, of a radar signal, wherein the radar signal is transmitted at a transmission time interval based on a TDM latency,
determine individual DOA data corresponding to the transmission antenna elements by classifying, according to the transmission antenna elements, radar data corresponding to a reflected signal of the transmitted radar signal received through the reception antenna elements, wherein the individual DOA is determined based on the transmission time interval, determine an unambiguous element of a phase error element by applying an ambiguous Doppler velocity that is based on the radar data to the phase error element of the individual DOA data, and determine integrated DOA data corresponding to the transmission antenna elements by integrating the individual DOA data by suppressing an ambiguous element of the phase error element; and a control system configured to control the vehicle based on the integrated DOA data.

24. The vehicle of claim 23, wherein the processor is configured to integrate the individual DOA data based on an absolute value of the ambiguous element of the phase error element.

25. The vehicle of claim 23, wherein the transmission antenna elements transmit the radar signal in an activation order, which is different from a disposition order in the radar sensor, the transmission antenna elements are classified into transmission groups of which sums of order values based on the activation order are the same, and the processor is configured to determine intermediate data by integrating the individual DOA data by the transmission groups, and determine the integrated DOA data by integrating the intermediate data.

26. The vehicle of claim 23, wherein the unambiguous element of the phase error element comprises a motion-induced unambiguous element of the phase error element.

27. A method comprising:

transmitting a signal through a transmission antenna, wherein the signal has a transmission time interval corresponding to a TDM latency;

receiving, by reception antennas, a reflected signal of the transmitted signal;

determining directions of arrival (DOAs) respectively corresponding to the transmission antenna elements based on the transmission time interval;

determining an unambiguous component of a phase error based on the reflected signal by applying an ambiguous Doppler velocity to the phase error of the DOAs; and based on the determining of the unambiguous component of the phase error, determining an integrated DOA by integrating the individual DOAs by suppressing an ambiguous component of the phase error component.

28. The method of claim 27, wherein the signal is for a TDM-based multiple-input MIMO radar system comprising the radar sensor, the transmission antenna, and the reception antennas.

29. The method of claim 28, wherein the individual DOAs are determined by classifying radar data components of the reflected signal respectively received through the reception antennas.

30. The method of claim 29, wherein the classifying comprises executing a constant false alarm rate algorithm.

31. The method of claim 27, wherein the unambiguous component of the phase error element-is motion-induced.

* * * * *